(12) United States Patent (10) Patent No.: US 12,597,656 B2
Kumar (45) Date of Patent: Apr. 7, 2026

(54) ASSEMBLIES AND METHODS THEREOF FOR ATTACHING ENERGY STORAGE DEVICES TO DEVICES IN NEED THEREOF

(71) Applicant: Ocella, Inc., Newberry, IN (US)

(72) Inventor: Rajan Kumar, Bloomington, IN (US)

(73) Assignee: Ocella, Inc., Newberry, IN (US)

( * ) Notice: Subject to any disclaimer, the term of this patent is extended or adjusted under 35 U.S.C. 154(b) by 1023 days.

(21) Appl. No.: 17/652,423

(22) Filed: Feb. 24, 2022

(65) Prior Publication Data

US 2022/0271371 A1 Aug. 25, 2022

Related U.S. Application Data

(60) Provisional application No. 63/153,272, filed on Feb. 24, 2021.

(51) Int. Cl.
| | |
|---|---|
| *H01M 50/178* | (2021.01) |
| *C09J 7/10* | (2018.01) |
| *C09J 7/38* | (2018.01) |
| *H01M 10/04* | (2006.01) |
| *H01M 10/647* | (2014.01) |

(Continued)

(52) U.S. Cl.
CPC ............. *H01M 50/102* (2021.01); *C09J 7/10* (2018.01); *C09J 7/385* (2018.01); *H01M 10/0436* (2013.01); *H01M 10/647* (2015.04); *H01M 50/178* (2021.01); *C09J 2203/33* (2013.01); *C09J 2433/00* (2013.01); *C09J 2467/00* (2013.01); *H01M 50/105* (2021.01)

(58) Field of Classification Search
CPC ............. H01M 50/105; H01M 50/178; H01M 50/246; H01M 10/647; H01M 10/052; H01M 10/0525; H01M 10/0436; H01M 10/126; H01M 10/623; H01M 2220/30
See application file for complete search history.

(56) References Cited

U.S. PATENT DOCUMENTS

| | | |
|---|---|---|
| 4,848,353 A | 7/1989 | Engel |
| 5,403,782 A | 4/1995 | Dixon et al. |

(Continued)

FOREIGN PATENT DOCUMENTS

| | | |
|---|---|---|
| CN | 105223600 A | 1/2016 |
| EP | 1787344 B1 | 2/2017 |

(Continued)

OTHER PUBLICATIONS

Schube et al., Applicability of Photonic Sintering and Autoclaving as Alternative Contact Formation Methods for Silicon Solar Cells with Passivating Contacts; Cite as: AIP Conference Proceedings 1999, 040019 (2018); https://doi.org/10.1063/1.5049282 Published Online: Aug. 10, 2018.

*Primary Examiner* — Jeremiah R Smith

(74) *Attorney, Agent, or Firm* — Knobbe, Martens, Olson & Bear, LLP

(57) ABSTRACT

Energy storage device assemblies comprising shaped energy storage devices (e.g., a sticker battery) and adhesive layers are disclosed. The adhesive layer may include a mounting adhesive, and may further include a conductive adhesive. The energy storage device assemblies may be mounted onto and electrically connected to a device in need of an energy storage device. Methods of fabrication and methods of use thereof are also disclosed.

21 Claims, 13 Drawing Sheets

(51) Int. Cl.
    *H01M 50/102*      (2021.01)
    *H01M 50/105*      (2021.01)

(56)            References Cited

U.S. PATENT DOCUMENTS

| | | | | |
|---|---|---|---|---|
| 6,358,644 | B1 * | 3/2002 | Shibata | H01M 50/126 |
| | | | | 429/177 |
| 7,129,005 | B2 | 10/2006 | Wensley et al. | |
| 8,869,913 | B2 | 10/2014 | Matthias et al. | |
| 9,224,516 | B2 | 12/2015 | Nelson et al. | |
| 9,871,273 | B2 | 1/2018 | Keates et al. | |
| 10,439,173 | B2 | 10/2019 | Kreitman | |
| 10,991,921 | B2 | 4/2021 | Kreitman | |
| 2004/0209160 | A1 | 10/2004 | Luski et al. | |
| 2009/0286150 | A1 * | 11/2009 | Nelson | H01M 50/178 |
| | | | | 429/162 |
| 2010/0136420 | A1 * | 6/2010 | Shin | H01M 50/211 |
| | | | | 429/178 |
| 2011/0183162 | A1 | 7/2011 | Chandler et al. | |
| 2012/0107573 | A1 | 5/2012 | Iwata et al. | |
| 2012/0270036 | A1 | 10/2012 | Kiuchi et al. | |
| 2013/0009105 | A1 | 1/2013 | Higuchi et al. | |
| 2018/0102513 | A1 * | 4/2018 | Kreitman | H01M 50/119 |
| 2018/0146545 | A1 * | 5/2018 | Wang | H05K 1/095 |
| 2018/0166658 | A1 * | 6/2018 | Seino | H01M 50/593 |
| 2020/0152932 | A1 * | 5/2020 | Ozawa | H01M 50/24 |
| 2022/0399571 | A1 | 12/2022 | Thokchom et al. | |

FOREIGN PATENT DOCUMENTS

| | | | |
|---|---|---|---|
| KR | 20070038148 | A | 4/2007 |
| KR | 101323812 | B1 | 10/2013 |
| WO | WO 2016/099632 | A1 | 6/2016 |
| WO | WO 2016/108888 | A1 | 7/2016 |

* cited by examiner

100

Roll to Roll Manufacturing

Custom Cutting & Packaging

Easy Integration by Sticking to Device

102

104

106

200

210    Packaging

206    Cathode

208B    Current Collector

Anode    202

Separator    204

208A

210

400A

400B

Active Electrode Film 402A

402B

404B

Foil 404A

Separator 502

Carrier Adhesive 504

506  Active Electrode film

Foil 508

510
Metal Current Collector

Active Electrode film 506

Foil 508

504  Carrier Adhesive

Separator 502

510
Metal Current Collector

600

Carrier Adhesive 604

Active Electrode film 606

Foil 608

Metal Current Collector 610

Active Electrode film 606

600

Foil 608

604 Carrier Adhesive

610
Metal Current Collector

ASSEMBLIES AND METHODS THEREOF FOR ATTACHING ENERGY STORAGE DEVICES TO DEVICES IN NEED THEREOF

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57, such as U.S. Provisional App. No. 63/153,272, filed Feb. 24, 2021.

BACKGROUND

Field

The present disclosure relates to energy storage devices, particularly to methods and compositions used for attaching energy storage devices to a device requiring an energy storage device.

Description of the Related Art

Batteries as a power source are becoming more popular and are in high demand. As the need for smaller and more versatile batteries is increasing, customizable sticker batteries have been utilized. As such, improved techniques for attaching sticker batteries to devices in need thereof would be beneficial.

SUMMARY

For purposes of summarizing the disclosure and the advantages achieved over the prior art, certain objects and advantages of the disclosure are described herein. Not all such objects or advantages may be achieved in any particular embodiment. Thus, for example, those skilled in the art will recognize that the invention may be embodied or carried out in a manner that achieves or optimizes one advantage or group of advantages as taught herein without necessarily achieving other objects or advantages as may be taught or suggested herein.

In one aspect, an energy storage device assembly is described. The device includes: a shaped energy storage device comprising a bottom side, a side wall, and a conductive tab, wherein a portion of the conductive tab extends through the side wall; and an adhesive layer comprising a mounting adhesive, wherein the mounting adhesive is disposed on the bottom side of the shaped energy storage device.

In some embodiments, the shaped energy storage device is a sticker energy storage device. In some embodiments, the mounting adhesive is selected from the group consisting of an acrylic based adhesive material, an acrylic based adhesive tape, a polyester based adhesive material, a polyester based adhesive tape, admixtures thereof, and combinations thereof. In some embodiments, the adhesive layer further comprises a conductive adhesive, and wherein the conductive adhesive is disposed over the portion of the conductive tab. In some embodiments, the conductive adhesive comprises an adhesive material and a conductive material. In some embodiments, the adhesive material is selected from the group consisting of acrylic based adhesive material, a polyester based adhesive material, admixtures thereof, and/or combinations thereof. In some embodiments, the conductive material is selected from the group consisting of a metal material, a conductive fiber material, and combinations thereof.

In another aspect, a device is described. The device includes: the energy storage device assembly described herein; and a device component comprising a device body and an electrical connection; wherein the mounting adhesive is disposed on the device body.

In some embodiments, the adhesive layer further comprises a conductive adhesive, and wherein the conductive adhesive is in contact with the portion of the conductive tab and the electrical connection. In some embodiments, the device further comprises a soldering material in contact with the portion of the conductive tab and the electrical connection. In some embodiments, the energy storage device assembly further comprises a light shield disposed over a top side of the shaped energy storage device. In some embodiments, the light shield comprises a substrate and a light reflectance additive.

In another aspect, a method of fabricating an energy storage device assembly is described. The method includes: forming a shaped energy storage device comprising a bottom side, a side wall, and a conductive tab, wherein a portion of the conductive tab extends through the side wall; and disposing an adhesive layer comprising a mounting adhesive on the bottom side of the shaped energy storage device.

In some embodiments, forming the shaped energy storage device comprises die cutting a plurality of energy storage device elements from a single film comprising a plurality of layers. In some embodiments, forming the shaped energy storage device comprises die cutting a plurality of energy storage device elements from a plurality of films each comprised of a single layer. In some embodiments, disposing the adhesive layer comprises calender rolling.

In another aspect, a method of attaching an energy storage device to a device in need thereof is described. The method includes: mounting the energy storage device assembly as described herein onto a device component comprising a device body and an electrical connection; wherein the mounting adhesive is pressed into contact with the device body.

In some embodiments, the method further comprises a conductive adhesive pressed into contact with the portion of the conductive tab and the electrical connection. In some embodiments, the method further comprises a soldering material disposed over the portion of the conductive tab and the electrical connection; and further comprising sintering the soldering material with a pulsed light beam into electrical contact with the portion of the conductive tab and the electrical connection. In some embodiments, the pulsed light beam comprises an irradiance of about 1-10 kW/cm², and is pulsed for an exposure time of about 5-500 ms.

All of these embodiments are intended to be within the scope of the invention herein disclosed. These and other embodiments will become readily apparent to those skilled in the art from the following detailed description of the preferred embodiments having reference to the attached figures, the invention not being limited to any particular preferred embodiment(s) disclosed.

BRIEF DESCRIPTION OF THE DRAWINGS

These and other features, aspects, and advantages of the present disclosure are described with reference to the drawings of certain embodiments, which are intended to illustrate certain embodiments and not to limit the invention.

DETAILED DESCRIPTION

Although certain embodiments and examples are described below, those of skill in the art will appreciate that the invention extends beyond the specifically disclosed embodiments and/or uses and obvious modifications and equivalents thereof. Thus, it is intended that the scope of the invention herein disclosed should not be limited by any particular embodiments described below.

The present disclosure relates to adhesive layers disposed on energy storage devices that may be used to attach and/or electrically connect the energy storage device to a device requiring an energy storage device. Adhesive layers may include mounting adhesives used to structurally secure the energy storage device to a device in need thereof, and/or conductive adhesives used to electrically connect the energy storage device to the device in need thereof.

In some embodiments, the energy storage device may be a sticker energy storage device (e.g., battery and/or capacitor), that may be cut or formed into custom shapes and sizes. In some embodiments, methods and apparatuses for fabricating customizable sticker energy storage devices may be performed through rotary subtractive manufacturing using cutting tools such as rotary die-cutting, laser cutting, and combinations thereof. In some embodiments, a process of developing customized shaped energy storage devices (e.g., batteries) and robotically mounting the energy storage devices onto a device in need thereof (e.g., a circuit board or an electronic circuit) is described.

Figure 1:
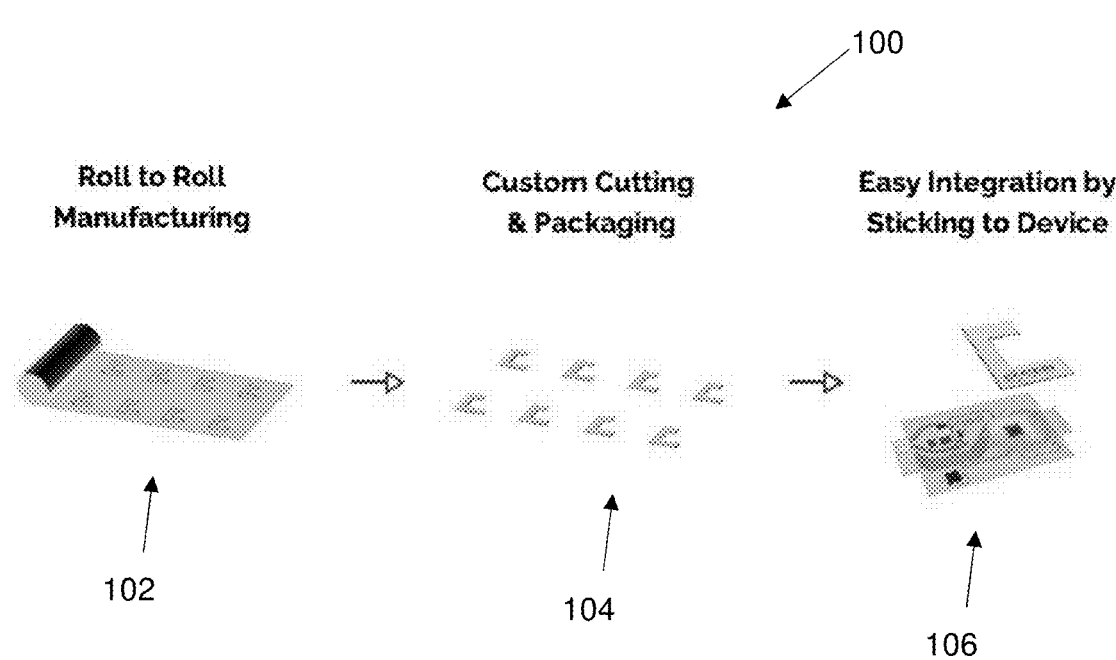
FIG. 1 is an illustration of a process for attaching energy storage devices to a device in need thereof, according to some embodiments.

FIG. 1 is an illustration of a process 100 for attaching energy storage devices to a device in need thereof, wherein a film roll 102 is cut to achieve a plurality of shaped films 104 that may be further processed and packaged into an energy storage device, and wherein the energy storage device is integrated into a device 106 in need thereof. In some embodiments, the film roll 102 and/or shaped films 104 may be single layered or multilayered. In some embodiments, the film roll 102 may include a first current collector, an anode electrode film, an electrolyte film, a separator, a cathode electrode film, and a second current collector, or any combinations thereof. In some embodiments, the film roll 102 is an electrode including a current collector and an electrode film, and may optionally further include an electrolyte film and/or a separator film, and subsequent to cutting the shaped films 104 from the roll 102 the electrode is assembled with additional layers and packaged to form an energy storage device. For example, in some embodiments, a film roll 102 including a current collector, an anode electrode film and an electrolyte film is cut into a first plurality of films 104, a second film roll including a cathode electrode film and a current collector is cut into a second plurality of films, and then the first and second plurality of films are assembled and packaged into an energy storage device. In some embodiments, a film roll 102 is a single layer film roll, is cut into a plurality of shaped films, and is assembled with other single layer and/or multilayered shaped films to form the energy storage device. In some embodiments, each layer of the film roll 102 and/or shaped film 104 has the same or different thickness.

Figure 2:
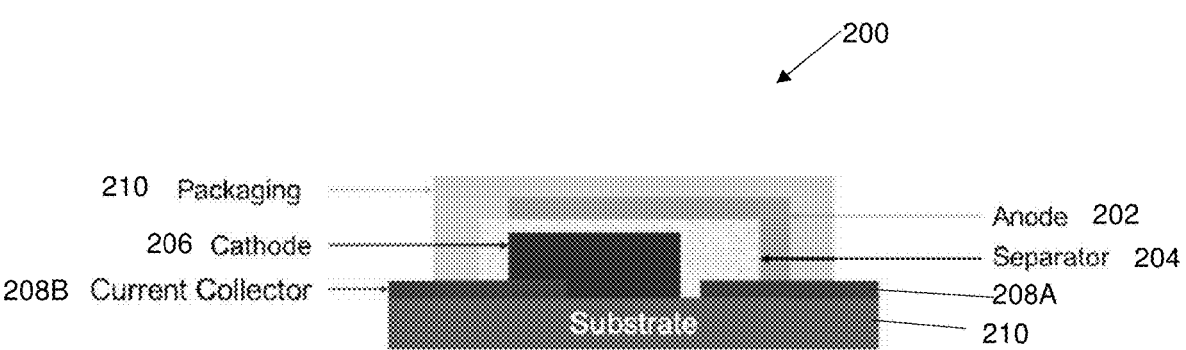
FIG. 2 is an illustration of an energy storage device, according to some embodiments.
Figure 3:
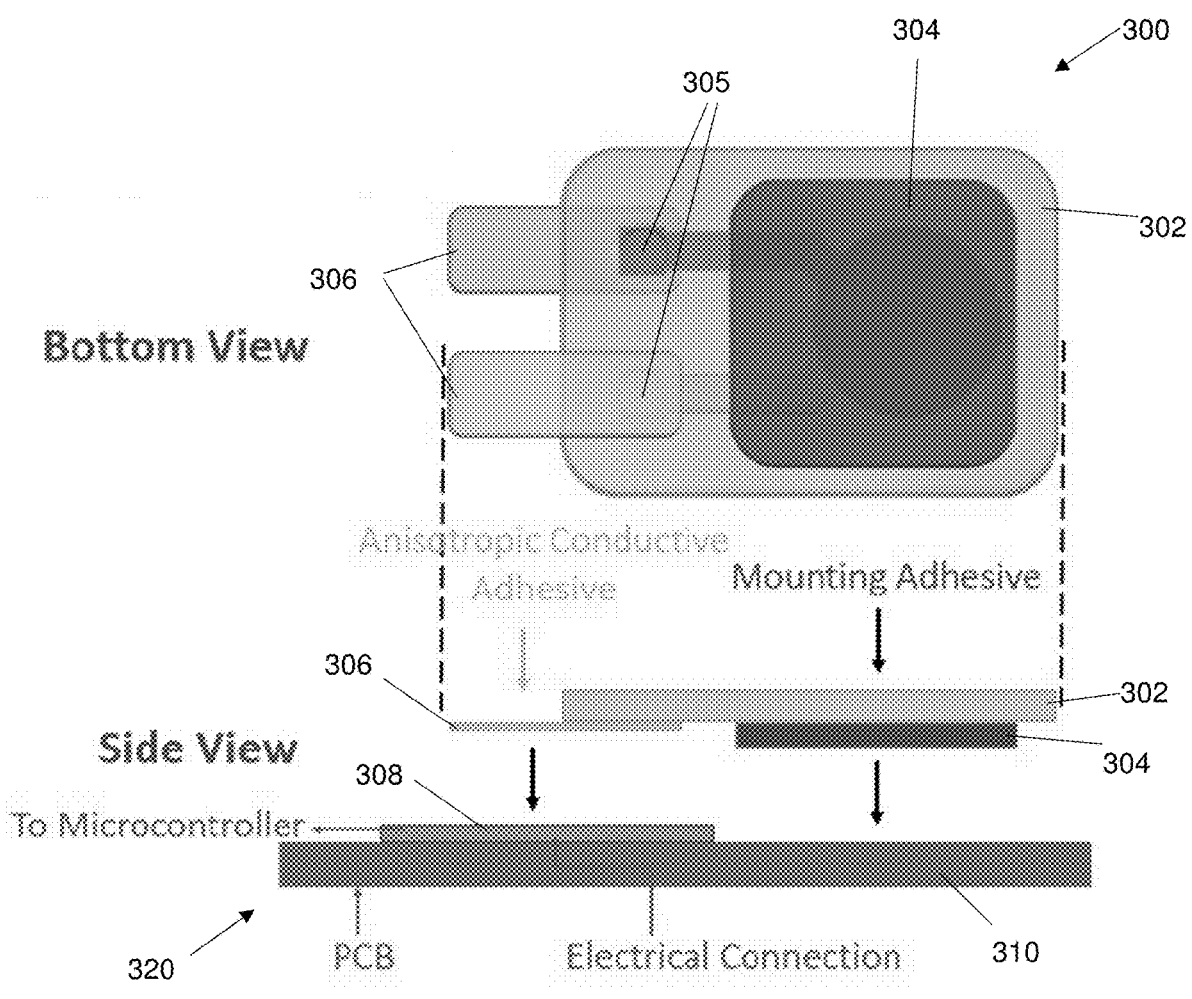
FIG. 3 is an illustration of an assembly including an energy storage device and adhesive layers for attaching to a device in need thereof, according to some embodiments.

FIG. 2 is an illustration of an assembled die cut shaped energy storage device 200. The energy storage device 200 includes an anode 202 and cathode 206 separated by a separator 204, which is encased in a packaging 210. The anode 202 is in electrical contact with current collector 208A, and cathode 206 is in electrical contact with current collector 208B. All components of the energy storage device are shown disposed over a substrate 210. In some embodiments, the energy storage device 200 may be sealed with a film (e.g, a water-impermeable and/or oxygen-impermeable film) that encases the energy storage device. In some embodiments, the energy storage device 200 further includes anode and cathode electrical connectors (e.g., leads and/or tabs) from the anode and cathode current collectors coming out of the sealed film and/or are exposed in order for the energy storage device to make electrical connections with a device in need thereof, for example as is shown in FIG. 3.

Energy storage devices can be primary or rechargeable energy storage devices, and in various forms. Prior to assembly and sealing the cell of the energy storage device, the device may be filled with an electrolyte. In some embodiments, the energy storage device is a battery, a capacitor, or a combination thereof. In some embodiments, the energy storage device is a solid state energy storage device such that the energy storage device includes a solid state electrolyte positioned between the cathode and anode. In some embodiments, the solid state electrolyte is in a semisolid (e.g., gel) or solid form.

Energy storage devices may include a first electrode that includes a first current collector in contact with a first electrode film (e.g. a cathode electrode with a cathode electrode film), and a second electrode that includes a second current collector in contact with a second electrode film (e.g. an anode electrode with an anode electrode film). The first current collector and the second current collector may facilitate electrical coupling between each corresponding electrode film and an external circuit (not shown). For example, a current collector can include a metallic material, such as a material comprising aluminum, nickel, copper, rhenium, niobium, tantalum, and noble metals such as silver, gold, platinum, palladium, rhodium, osmium, iridium and alloys and combinations of the foregoing. For example, a current collector can comprise a metal foil, for example, a nickel foil, an aluminum foil, a carbon foil, a copper foil, a carbon coated metal foil, or a tantalum coated metal foil. An electrode includes at least one electrode film on or disposed over a surface of a current collector. In some embodiments, an electrode may be a multilayer electrode and comprise more than one electrode film, for example, such as a first electrode film and a second electrode film disposed on the same or different sides of a current collector. In some embodiments, the multilayered electrode is heterogeneous such that the properties, loading, thickness and/or composition of a first electrode film is different than that of a second electrode film of the electrode.

An electrode film may comprise a cathode active material or an anode active material. In some embodiments, the electrode film comprises the active material in, in about, in at least, or in at least about, 60 wt. %, 65 wt. %, 70 wt. %, 75 wt. %, 80 wt. %, 85 wt. %, 90 wt. %, 92 wt. %, 95 wt. %, 97 wt. %, 98 wt. % or 99 wt. %, or any range of values therebetween.

The cathode active material can include, for example, carbon monofluoride (CFx), metal oxide, metal sulfide, or a lithium metal oxide. The lithium metal oxide can be, for example, a lithium nickel manganese cobalt oxide (NMC), a lithium manganese oxide (LMO), a lithium iron phosphate (LFP), a lithium cobalt oxide (LCO), a lithium titanate (LTO), and/or a lithium nickel cobalt aluminum oxide (NCA). In some embodiments, cathode active materials can comprise, for example, a layered transition metal oxide (such as $LiCoO_2$ (LCO), $Li(NiMnCo)O_2$ (NMC) and/or $LiNi_{0.8}Co_{0.15}Al_{0.05}O_2$ (NCA)), a spinel manganese oxide (such as $LiMn_2O_4$ (LMO) and/or $LiMn_{1.5}Ni_{0.5}O_4$ (LMNO)), an olivine (such as $LiFePO_4$), chalcogenides ($LiTiS_2$), tavorite ($LiFeSO_4F$), silicon, silicon oxide (SiOx), aluminum, tin, tin oxide (SnOx), manganese oxide (MnOx), molybdenum oxide ($MoO_2$), molybdenum disulfide ($MoS_2$), nickel oxide (NiOx), or copper oxide (CuOx).

The anode active materials can include, for example, an insertion material (such as carbon, graphite (natural, synthetic or blends), hard or amorphous carbons and/or graphene), an alloying/dealloying material (such as silicon, silicon oxide, tin, and/or tin oxide), a metallic element, metal alloy or compound (such as Si—Al, and/or Si—Sn), and/or a conversion material (such as manganese oxide, molybdenum oxide, nickel oxide, and/or copper oxide). The anode active materials can be used alone or mixed together to form multi-phase materials (such as Si—C, Sn—C, SiOx-C, SnOx-C, Si—Sn, Si—SiOx, Sn—SnOx, Si—SiOx-C, Sn—SnOx-C, Si—Sn—C, SiOx-SnOx-C, Si—SiOx-Sn, or Sn—SiOx-SnOx.).

The electrode film may comprise a binder. In some embodiments the electrode film comprises the binder in, in about, in at most, in at most about, 0.5 wt. %, 1 wt. %, 2 wt. %, 3 wt. %, 4 wt. %, 5 wt. %, 6 wt. %, 7 wt. %, 8 wt. %, 9 wt. %, 10 wt. %, 15 wt. %, 20 wt. % or 25 wt. %, or any range of values therebetween. In some embodiments, the binder is a polymerizable binder. In some embodiments, the polymerizable binder is electron beam ("e-beam" or "EB") polymerizable. Binders may include an acrylated polyurethane resin (e.g. Ucecoat 7689, Ucecoat 7510, and Ucecoat 7690 (i.e. a polyurethane acrylate, acrylate ester and/or acrylated monomer dispersion in water)), a hydroxy modified acrylated polyurethane resin (e.g., hydroxy modified Ucecoat 7690), an acrylate-methacrylate monomer blend (e.g. Ebecryl 109), a monoacrylate of mono-ethoxylated phenol (e.g. Ebecryl 114), trimethylolpropane ethoxy triacrylate (TMPEOTA), polytetrafluoroethylene (PTFE), a polyolefin, polyalkylenes, polyethers, styrene-butadiene, co-polymers of polysiloxanes, a polysiloxane, branched polyethers, polyvinylethers, co-polymers thereof, and/or admixtures thereof. The binder can include a cellulose, for example, carboxymethylcellulose (CMC). In some embodiments, the polyolefin can include polyethylene (PE), polypropylene (PP), polyvinylidene fluoride (PVDF), co-polymers thereof, and/or mixtures thereof. For example, the binder can include polyvinylene chloride, poly(phenylene oxide) (PPO), polyethylene-block-poly(ethylene glycol), poly(ethylene oxide) (PEO), poly(phenylene oxide) (PPO), polyethylene-block-poly(ethylene glycol), polydimethylsiloxane (PDMS), polydimethylsiloxane-coalkylmethylsiloxane, co-polymers thereof, and/or admixtures thereof. In some embodiments, the binder may include an acrylated polyurethane resin, an acrylate-methacrylate monomer blend, a monoacrylate of mono-ethoxylated phenol, polyvinylidene fluoride (PVDF), and combinations thereof. In some embodiments, the binder may include an acrylated polyurethane resin, an acrylate-methacrylate monomer blend, a monoacrylate of mono-ethoxylated phenol, and combinations thereof.

The energy storage device can include any number of different types of electrolyte. For example, in some embodiments the device can include a lithium ion battery electrolyte, which can include a lithium source, such as a lithium salt, and a solvent, such as an organic solvent. In some embodiments, the device can further include an additive, such as solid electrolyte interphase (SEI)-forming additive, an electrode wetting additive, or a separator wetting additive. In some embodiments, a lithium salt can include lithium hexafluorophosphate ($LiPF_6$), lithium tetrafluoroborate ($LiBF_4$), lithium perchlorate ($LiClO_4$), lithium bis(trifluoromethansulfonyl)imide ($LiN(SO_2CF_3)_2$), lithium trifluoromethansulfonate ($LiSO_3CF_3$), lithium bis(pentafluoroethanesulfonyl)imide ($C_4F_{10}LiNO_4S_2$), lithium bis(fluorosulfonyl)imide ($F_2LiNO_4S_2$), lithium bis(oxalato) borate ($LiB(C_2O_4)_2$), lithium difluoro(oxalato) borate ($LiBF_2(C_2O_4)$), lithium difluorophosphate ($F_2LiO_2P$), lithium oxalyldifluoroborate, lithium trifluorochloroborate ($LiBF_3Cl$), lithium hexafluoroarsenate ($LiAsF_6$), combinations thereof, and/or the like. In some embodiments, a lithium ion electrolyte solvent can include one or more ethers and/or esters. For example, a lithium ion electrolyte solvent may comprise ethylene carbonate (EC), dimethyl carbonate (DMC), diethyl carbonate (DEC), ethyl methyl carbonate (EMC), vinyl carbonate (VC), propylene carbonate (PC), combinations thereof, and/or the like. For example, the electrolyte may comprise $LiPF_6$, ethylene carbonate, propylene carbonate and diethyl carbonate. In some embodiments, the device can include a solid state electrolyte. In some embodiments, the solid state electrolyte also functions as a separator.

Electrodes described herein may be prepared by various processes. As one example, in some embodiments an electrode film mixture (e.g. comprising the active material, binder, and optionally additives) are combined with a solvent to form an electrode film slurry. In some embodiments, the solvent is an aqueous solvent, an organic solvent, or a combination thereof. As another example, in some embodiments an electrode film mixture (e.g. comprising the active material, binder, and optionally additives) are combined and an electrode film is formed in a solvent-free dry electrode manufacturing process. In some embodiments, the electrode film mixture further comprises a surfactant and/or an additive (e.g. a conductive additive). In some embodiments, the solvent includes water, N-methylpyrrolidone (NMP), other organic solvents, or combinations thereof. The electrode film slurry may then be cast upon a substrate to form an as-cast electrode film. In some embodiments, casting of the electrode film slurry may be performed using a doctor blade, spray coating, comma bar, slot die, aerosol, gravure, screen printing, imprinting, spin-coating, electrospinning, and combinations thereof. The as-cast electrode film may then be dried and/or cured to form an electrode film. In some embodiments, the as-cast electrode film or electrode film is calendered (e.g. a roll-to-roll process). In solvent-free dry electrode manufacturing processes the electrode film may be formed using dry materials, such as a calendering process. In some embodiments, the substrate which the dry electrode film or electrode film slurry is cast upon is a current collector, and as such an electrode is formed once the electrode film is deposited, dried and/or cured.

Drying may be performed by heating the as-cast electrode film to evaporate the solvent. Curing may be performed to polymerize the binder to form a binder matrix within the electrode film. In some embodiments, curing is performed by an energy source, such as for example photons and/or electrons. In some embodiments, curing is performed by an electron beam ("e-beam" or "EB"). In some embodiments, the curing is performed with an EB with, with about, with at least, or with at least about, 50 kV, 100 kV, 150 kV, 200 kV, 250 kV 300 kV, or any range of values therebetween. In some embodiments, the curing is performed with an EB with, with about, with at least, or with at least about, 15 kGy, 20 kGy, 25 kGy, 30 kGy, 40 kGy, 50 kGy, 60 kGy, 70 kGy, 80 kGy or 100 kGy, or any range of values therebetween.

Once an energy storage device (e.g., battery) is packaged and assembled based on a customized shape, one or more adhesive layer may be disposed on the energy storage device. In some embodiments, an adhesive layer includes one or more conductive adhesives (e.g., an anisotropically conductive (AC) adhesive), one or more mounting adhesives, admixtures thereof, and/or combinations thereof. The mounting adhesive may be used to structurally secure the energy storage device to a device in need thereof in order to improve the functionality of the battery during times of strain (e.g., bending, flexing, and/or twisting). In some embodiments, the mounting adhesive nonelectrically connects the energy storage device to the device in need thereof. The conductive adhesive may be used to electrically connect the energy storage device to the device in need thereof. In some embodiments, the conductive adhesive also structurally secures the energy storage device to a device in need thereof. In some embodiments, the mounting adhesive has a greater adhesive strength than the conductive adhesive. In some embodiments, mounting adhesives include an acrylic based adhesive material and/or adhesive tape (e.g., 3M VHD Tapes F9460C, 9469PC, 444, 9786, 9629PC and 99786), a polyester based adhesive material and/or adhesive tape (e.g., Electronic Tap 82320), admixtures thereof, and/or combinations thereof. In some embodiments, conductive adhesives include an adhesive material and a conductive material. In some embodiments, the adhesive material may include an acrylic based adhesive material, a polyester based adhesive material, admixtures thereof, and/or combinations thereof. In some embodiments, the conductive material may include a metal material, a conductive fiber material, or combinations thereof. In some embodiments, the metal material includes a metal selected from silver, gold, nickel, or combinations. In some embodiments, the conductive fiber is selected from graphite, graphene, carbon nanotubes, carbon fullerenes, or combinations thereof. For example, in some embodiments conductive adhesives include an adhesive with gold-coated nickel particles (e.g., 3M ACF Adhesives 5363, 7371 and 7303), a conductive pressure sensitive adhesive tape (e.g, 3M tape 9713 XYZ), and combinations thereof.

For example, FIG. 3 shows an assembly 300 including an energy storage device 302 disposed over adhesive layers, wherein the adhesive layers include a mounting adhesive 304 and a pair of AC adhesives 306, and wherein each of the AC adhesives 306 are in electrical contact with respective positive (i.e., cathode) and negative (i.e., anode) leads 305 of the energy storage device 302. In some embodiments, the conductive adhesive is attached to or die-cut onto the leads or an exposed location of the current collector of the energy storage device. A device in need of an energy storage device 320 (e.g., a printed circuit board (PCB)) is also shown, and comprises a body 310 and electrical connection 308, wherein electrical connection 308 is in electrical communication with a microcontroller. FIG. 3 depicts that assembly 300 may be disposed over (e.g., mounted) onto device 320 by bringing mounting adhesive 304 into contact with body 310, and bringing AC adhesive 306 in contact with electrical connection 308, thereby electrically connecting the energy storage device 302 to the device 320 in need thereof. In some embodiments, the adhesive layer consists, or consists essentially of the mounting adhesive. In some embodiments, the adhesive layer consists, or consists essentially of the conductive adhesive. In some embodiments, the mounting adhesive is used in combination with the conductive adhesive. In some embodiments, the energy storage device is mounted to the device without additional fastening elements, such as additional adhesives, tapes, screws, bolts or combinations thereof.

In some embodiments, a soldering material is utilized to electrically connect the energy storage device to the device in need thereof. In some embodiments, the soldering material is used in addition to or in place of the conductive adhesive. In some embodiments, the solder material includes a soldering metal, a polymer material and a solvent. In some embodiments, the soldering material is a paste. In some embodiments, the soldering metal is a tin based metal. In some embodiments, the soldering metal is a composite metal. In some embodiments, the soldering metal includes metal nanoparticles. In some embodiments, the soldering metal includes tin, lead, silver, copper, bismuth, or any combination thereof.

The soldering material may be sintered to create a robust electrical connection between the energy storage device and a device in need thereof through a photonic sintering process, also known as intense pulsed light or flash-assist rapid thermal processing (RTP). The photonic sintering process may include pulsing a beam of light of a broad emission spectrum and with a peak in the ultraviolet wavelength range onto the soldering material, wherein the radiation of the pulsed beam is absorbed by the soldering metal to result in a sintering process primarily controlled by the intensity of the radiation and its duration. The irradiance of the pulsed beam is, or is about, $0.5 \ kW/cm^2$, $1 \ kW/cm^2$, $2 \ kW/cm^2$, $3 \ kW/cm^2$, $4 \ kW/cm^2$, $5 \ kW/cm^2$, $6 \ kW/cm^2$, $7 \ kW/cm^2$, $8 \ kW/cm^2$, $9 \ kW/cm^2$, $10 \ kW/cm^2$ or $15 \ kW/cm^2$, or any range of values therebetween. The exposure time is, or is about, 0.5 ms, 1 ms, 2 ms, 3 ms, 4 ms, 5 ms, 6 ms, 7 ms, 8 ms, 9 ms, 10 ms, 20 ms, 30 ms, 40 ms, 50 ms, 60 ms, 70 ms, 80 ms, 90 ms, 100 ms, 200 ms, 300 ms, 400 ms, 500 ms, 600 ms, 700 ms, 800 ms, 900 ms or 1000 ms, or any range of values therebetween. Photonic sintering is utilized to heat and sinter the soldering material without significantly heating or damaging other materials, such as the materials and layers of the energy storage device and the device in need thereof, as the soldering material rapidly increases in temperature when exposed to the light beam and, due to the short exposure time, the soldering material is sintered before heat is transferred significantly to the substrate. In some embodiments, a light shield may be utilized on assemblies or devices in order to further protect them from damage from the light beam, such as the energy storage device and/or the device in need thereof. In some embodiments, the light shield may include a substrate (e.g., Polyethylene terephthalate ("PET") and/or a light reflectance additive). Examples of a light shield include 3M Light Shielding Tape 55201H.

Figure 4:
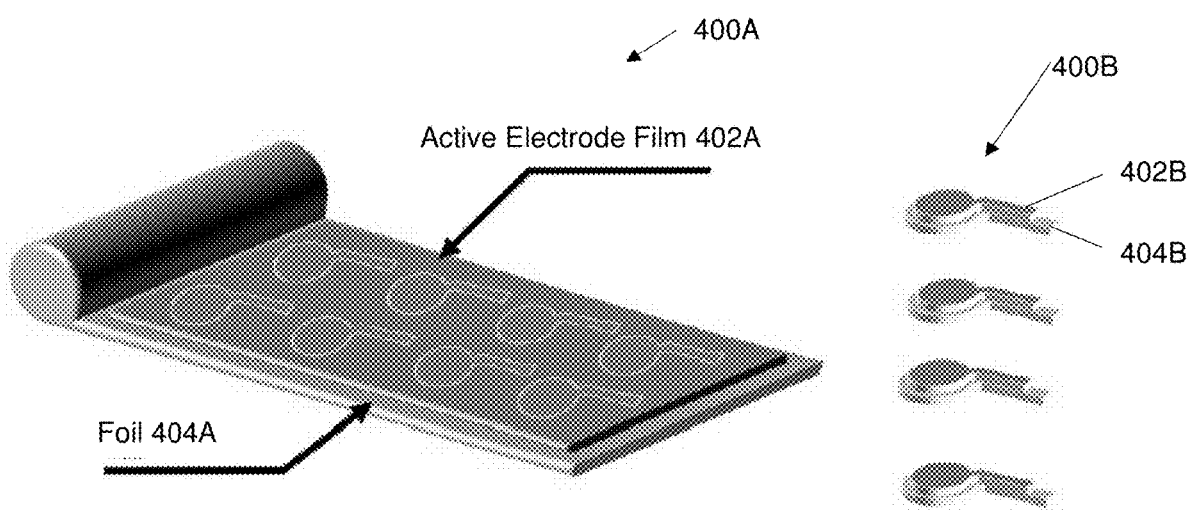
FIG. 4 is a perspective view of die cutting an electrode, according to some embodiments.

FIG. 4 is a perspective view of a film roll 400A of an electrode die cut into a plurality of shaped electrodes 400B. Film roll 400A includes an active electrode film 402A disposed over a current collector foil 404A. A die cuts a plurality of shaped electrodes 400B from the film roll 400A, each of which includes a shaped active electrode film 402B and a shaped foil 404B.

Figure 5A:
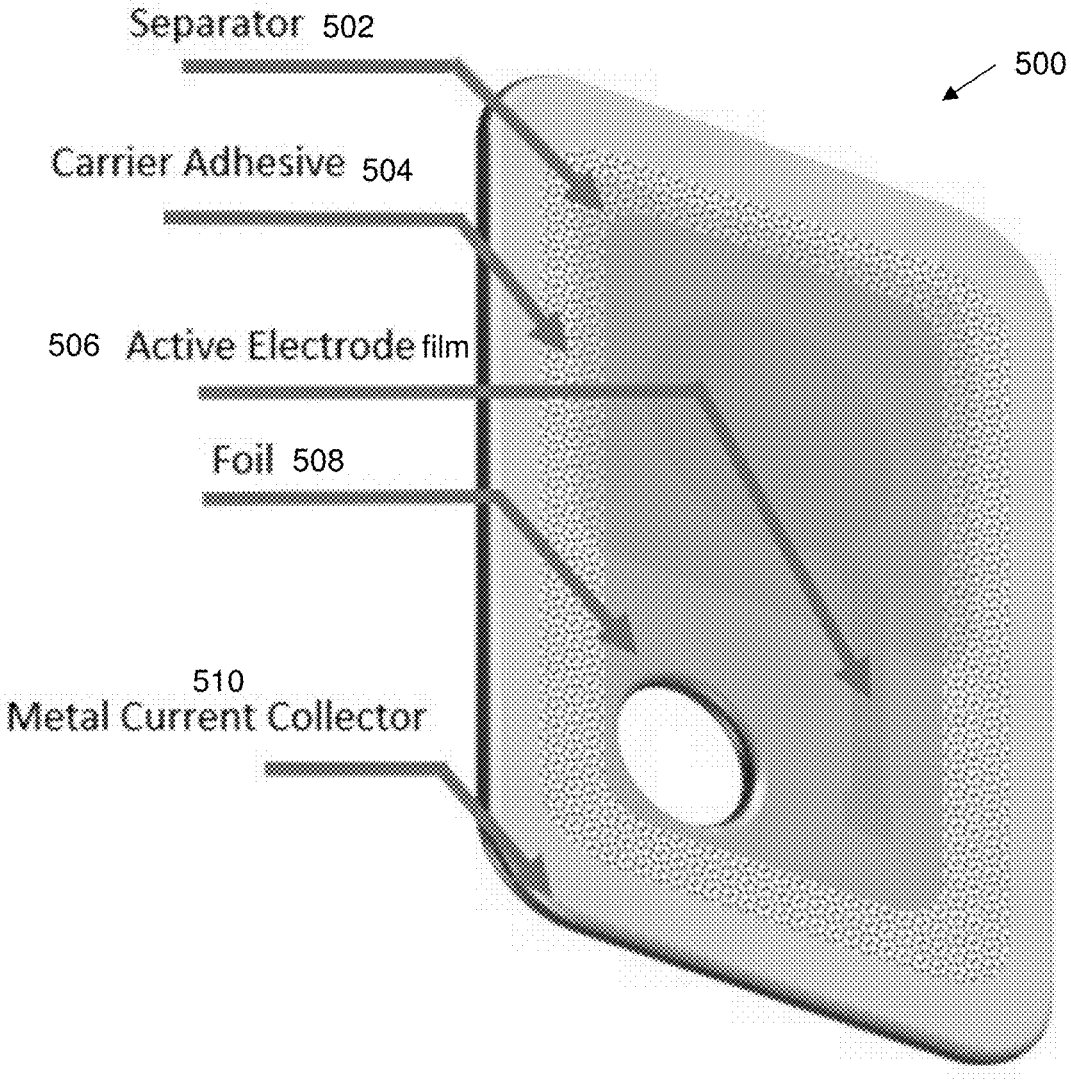
FIG. 5A is a front perspective view of an anode electrode, according to some embodiments.
Figure 5B:
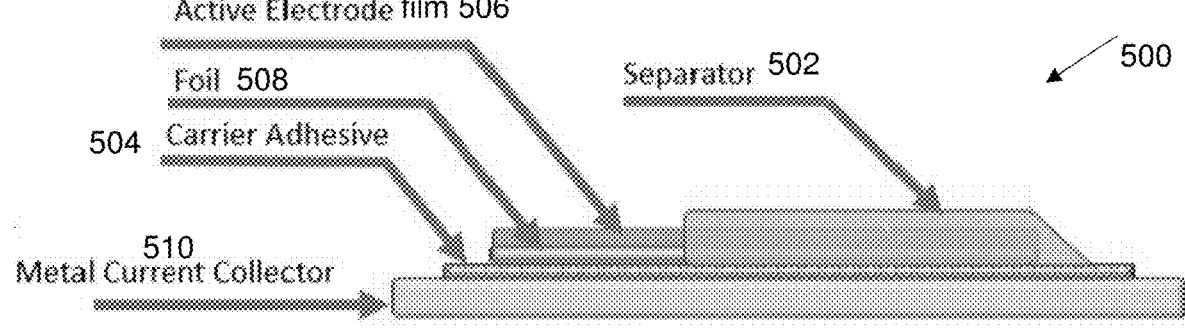
FIG. 5B is a side view of the anode electrode of FIG. 5A.
Figures 6A, 6B:
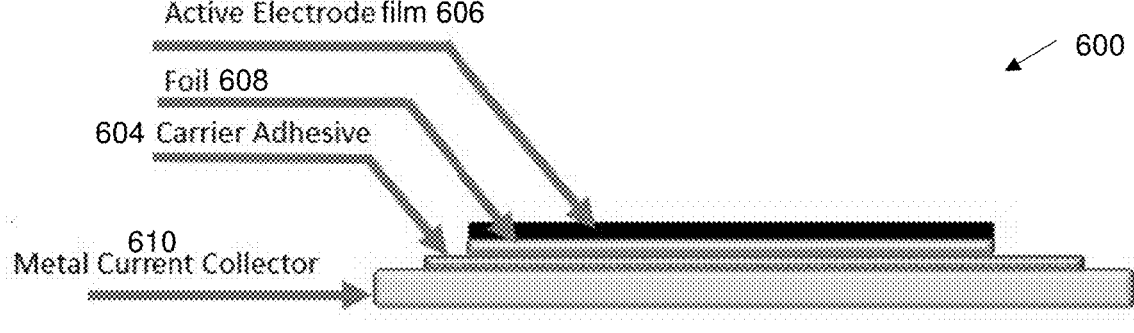
FIG. 6A is a front perspective view of a cathode electrode, according to some embodiments.
FIG. 6B is a side view of the cathode electrode of FIG. 6A.
Figure 7:
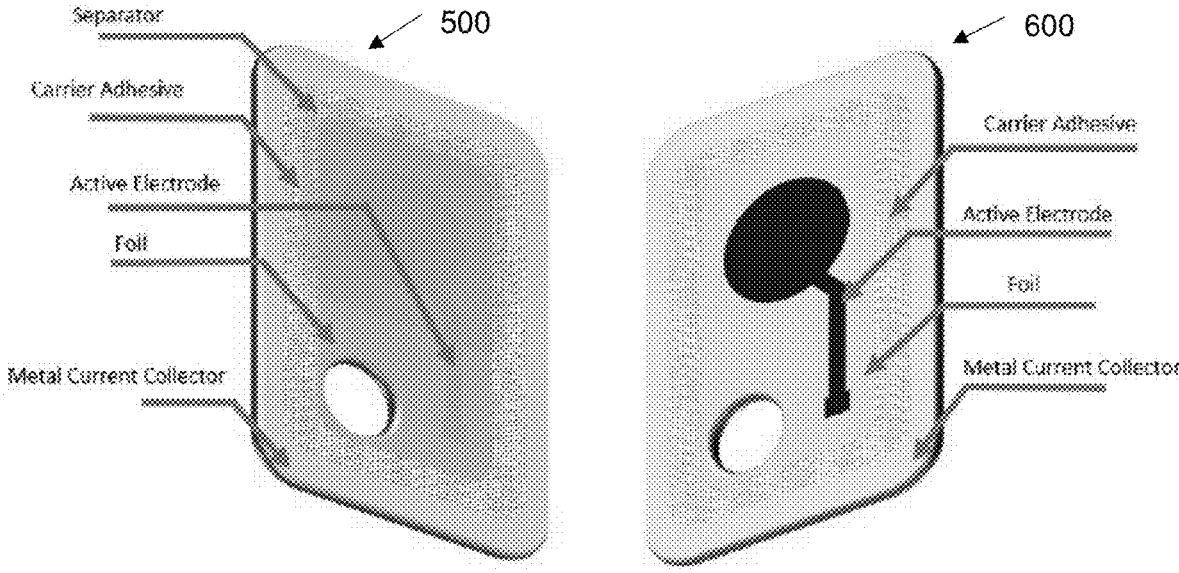
FIG. 7 is an exploded perspective view of an energy storage device that comprises the anode electrode and the cathode electrode of FIGS. 5A and 6A, respectively.
Figure 8:
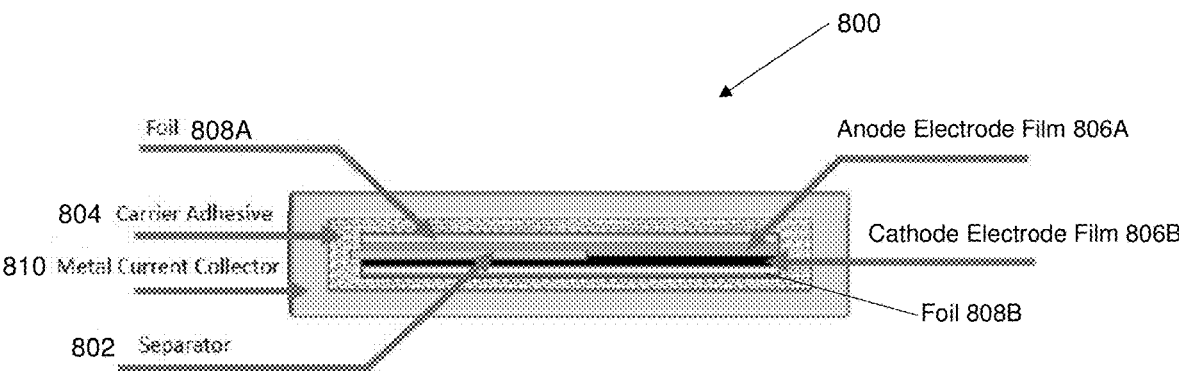
FIG. 8 is a side view of an energy storage device, according to some embodiments.

FIGS. 5A and 5B depict a shaped anode electrode 500, which includes an anode active electrode film 506 disposed over a foil 508, which is disposed over a carrier adhesive 504, which is disposed over a metal current collector 510, and a separator 502 is disposed over and encases the anode active electrode film 506 and foil 508. FIGS. 6A and 6B depict a shaped cathode electrode 600, which includes a cathode active electrode film 606 disposed over a foil 608, which is disposed over a carrier adhesive 604, which is disposed over a metal current collector 610. FIG. 7 shows shaped anode electrode 500 and shaped cathode electrode 600 prior to assembly as an energy storage device. FIG. 8 shows shaped anode electrode 500 and shaped cathode electrode 600 assembled to form an energy storage device 800. Energy storage device 800 includes anode foil 808A disposed over anode electrode film 806A, which is disposed over separator 802, which is disposed over cathode electrode film cathode electrode film 806B, and which is disposed over cathode foil 808B, all of which are encased in carrier adhesive 804 and wherein carrier adhesive 804 is encased in metal current collector 810. In some embodiments, the carrier adhesives of the separate anode and cathode (e.g., carrier adhesives 504 and 604 of FIGS. 5A-6B) are formed into a single encasing carrier adhesive (e.g., carrier adhesive 804) when the anode and cathode are assembled. In some embodiments, a carrier adhesive (CA) is used to secure all energy storage device (e.g., battery) components during assembly. In some embodiments, the metal current collectors of the separate anode and cathode (e.g., metal current collectors 510 and 610 of FIGS. 5A-6B) are formed into a single encasing metal current collector (e.g., metal current collector 810) when the anode and cathode are assembled.

Figure 9A:
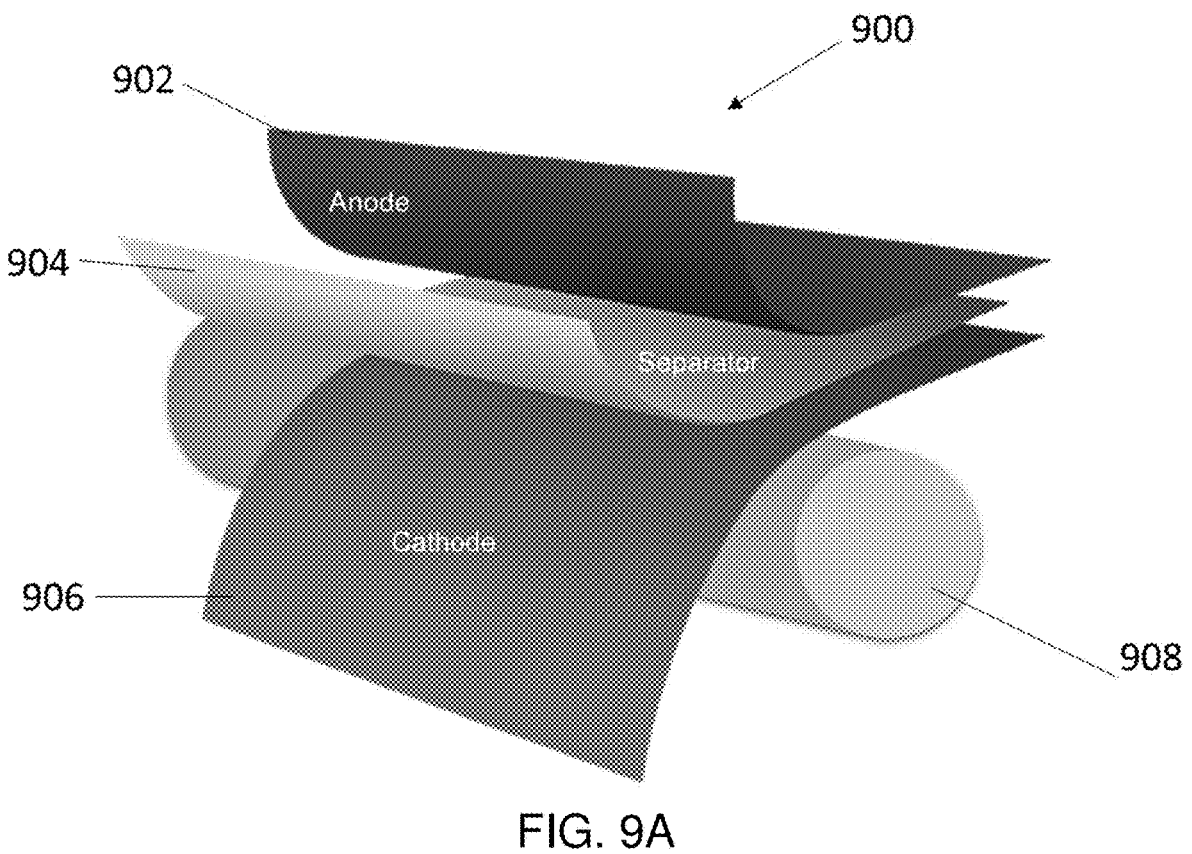
FIG. 9A is an illustration of a reel-to-reel process for preparing an anode-separator-cathode stack, according to some embodiments.
Figure 9B:
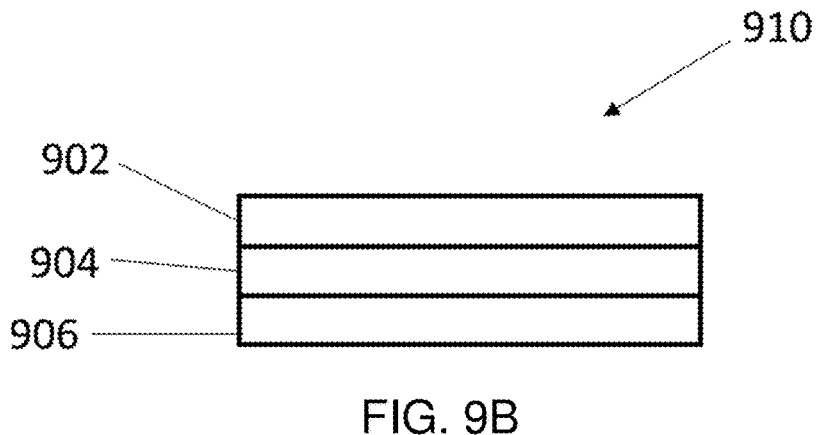
FIG. 9B is a side view illustration of an anode-separator-cathode stack, according to some embodiments.

FIG. 9A is an illustration of a reel-to-reel process for preparing an anode-separator-cathode stack 900. An anode film 902, which includes a foil and an anode electrode film, is disposed over a separator film 904, which is disposed over a cathode film 906, which includes a foil and a cathode electrode film, and are laminated (e.g., calendered) in a reel-to-reel process using roller 908 to form an anode-separator-cathode stack 910 shown in FIG. 9B. Although the anode-separator-cathode stack 910 of FIG. 9B only depicts the anode film 902, separator film 904 and cathode film 906, other components of an energy storage device may be included in the stack assembly including carrier adhesives and metal current collectors. For example, the process of FIG. 9A may be utilized to form an energy storage device, such as the energy storage device 800 of FIG. 8. For the sake of simplicity FIGS. 9B-13B depict anode-separator-cathode stacks within the assemblies depicted, however it is to be understood that in some embodiments the anode-separator-cathode stacks may represent an energy storage device.

Figure 10A:
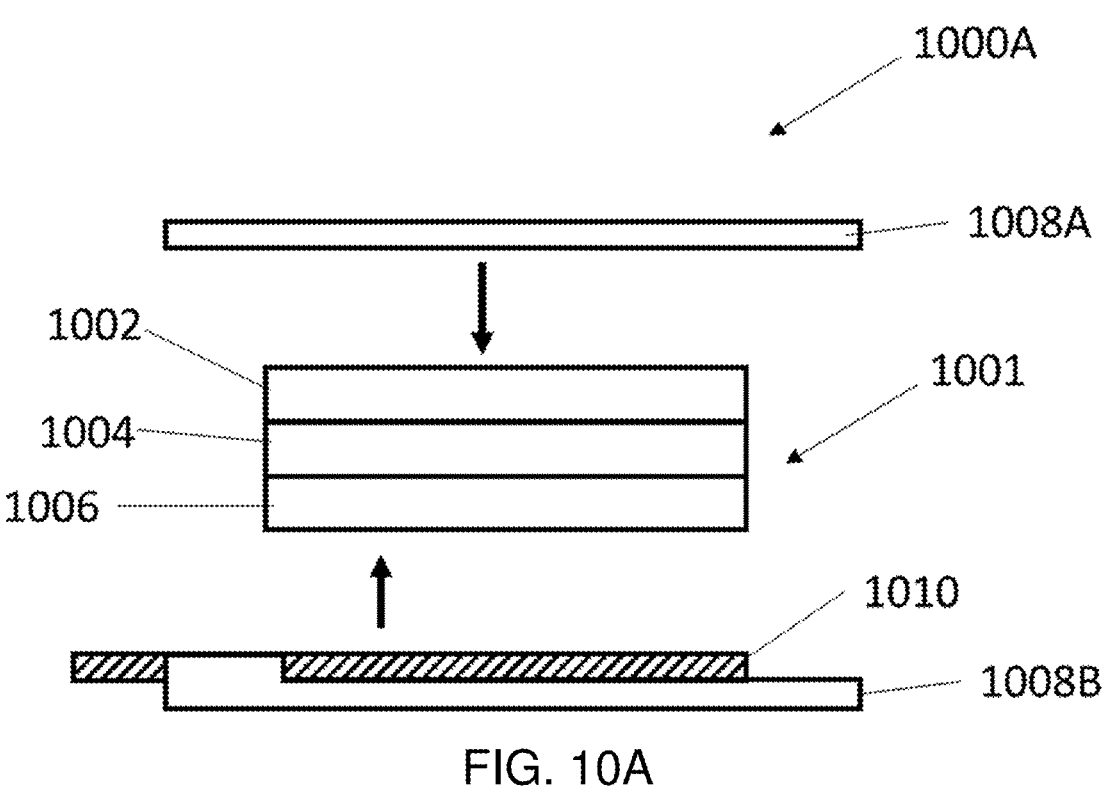
FIG. 10A is a side view illustration of forming an encapsulated energy storage device, according to some embodiments.
Figure 10B:
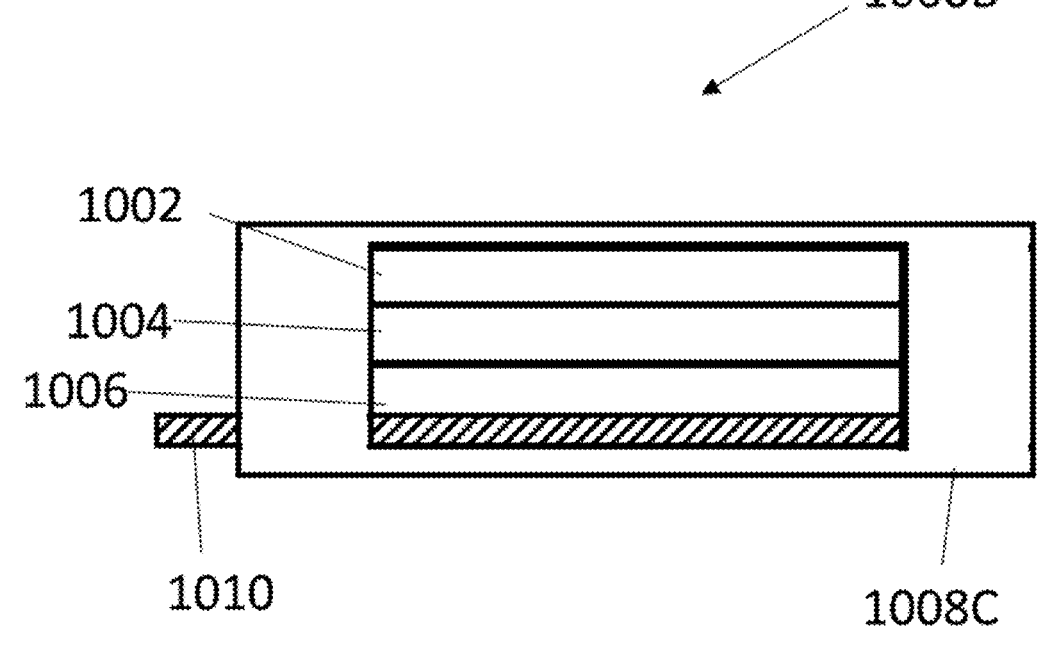
FIG. 10B is a side view illustration of an encapsulated energy storage device, according to some embodiments.

In FIG. 10A, a lamination process 1000A of forming an encapsulated energy storage device is shown, wherein an anode-separator-cathode stack 1001, including an anode film 1002, a separator film 1004 and a cathode film 1006, is disposed between a top sealing material 1008A (e.g., aluminum sealing package) and a bottom sealing material 1008B. Disposed over the bottom sealing material 1008B is a conductive tab 1010 (e.g., adhesive tab) that extends through a side wall of the bottom sealing material 1008B. Once the lamination process 1000A is performed an encapsulated energy storage device 1000B is obtained as shown in FIG. 10B, wherein top and bottom sealing materials 1008A and 1008B are combined to form encapsulating sealing material 1008C.

Figures 11A, 11B:
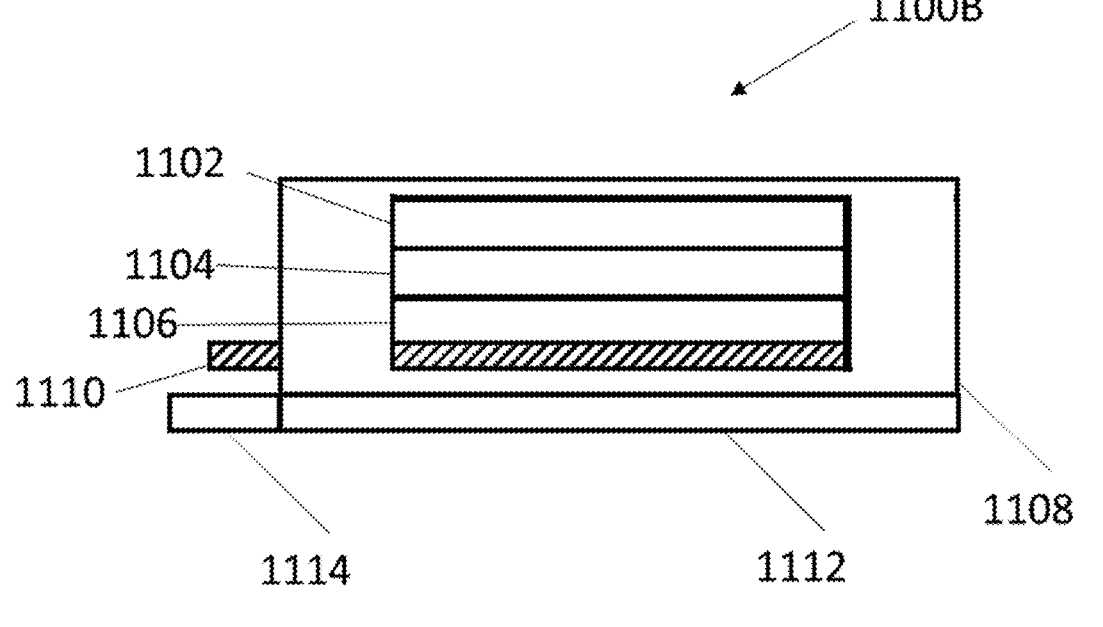
FIG. 11A is a side view illustration of disposing an encapsulated energy storage device over an adhesive layer, according to some embodiments.
FIG. 11B is a side view illustration of an adhesive attached energy storage device, according to some embodiments.

In FIG. 11A, a deposition process 1100A of disposing an encapsulated energy storage device 1120 over an adhesive layer 1130 is shown. The encapsulated energy storage device 1120 includes an anode film 1102, a separator film 1104, a cathode film 1106 and a conductive tab 1110 disposed over one another and encapsulated by a sealing material 1108, wherein the conductive tab 1110 extends through a side wall of the sealing material 1108. The adhesive layer 1130 includes a mounting adhesive 1112 positioned beneath the bottom side of the encapsulated energy storage device 1120 proximate to the conductive tab 1110, and a conductive adhesive 1114 (e.g., an AC fiber adhesive) position beneath the portion of the conductive tab 1110 extending through a side wall of the sealing material 1108. In some embodiments, the conductive adhesive 1114 is disposed over or on the portion of the conductive tab 1110. Once the deposition process 1100A is performed an adhesive attached energy storage device 1100B is obtained as shown in FIG. 11B.

Figure 12:
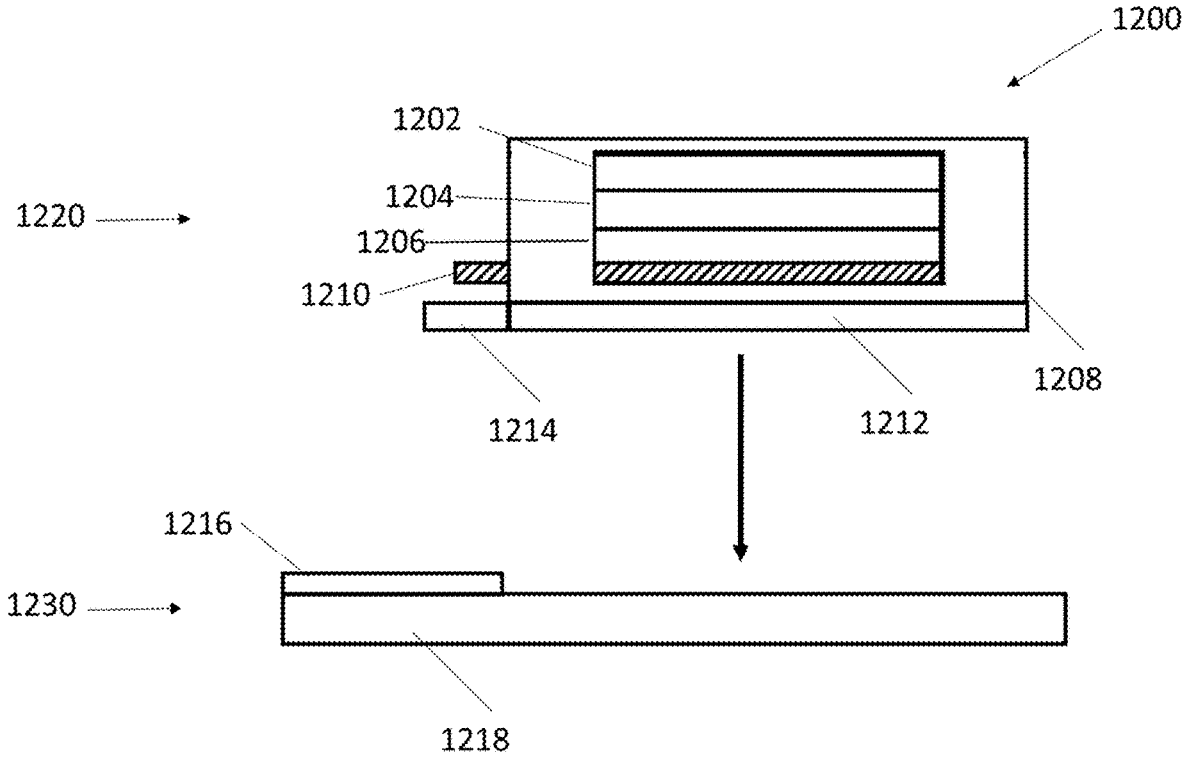
FIG. 12 is a side view illustration of disposing an adhesive attached energy storage device over a device in need thereof, according to some embodiments.

In FIG. 12, a process 1200 for attaching an adhesive attached energy storage device 1220 to a device 1230 in need of an energy storage device is shown. The adhesive attached energy storage device 1220 includes an anode film 1202, a separator film 1204, a cathode film 1206 and an conductive tab 1210 disposed over one another and encapsulated by a sealing material 1208, wherein the conductive tab 1210 extends through a side wall of the sealing material 1208; and further a mounting adhesive 1212 disposed beneath the bottom side of the sealing material 1208 proximate to the conductive tab 1210, and a conductive adhesive

1214 positioned beneath the portion of the conductive tab 1210 extending through a side wall of the sealing material 1208. The device 1230 includes a body 1218 (e.g., a PCB) with an electrical connection 1216 (e.g., a copper pad) in electrical communication with the body 1218. The adhesive attached energy storage device 1220 is brought into contact and attached to the device 1230 by bringing mounting adhesive 1212 into contact with body 1218, and bringing conductive adhesive 1214 in contact with electrical connection 1216 an in the process also in contact with the portion of the conductive tab 1210, thereby electrically connecting the energy storage device to the device 1230.

Figure 13A:
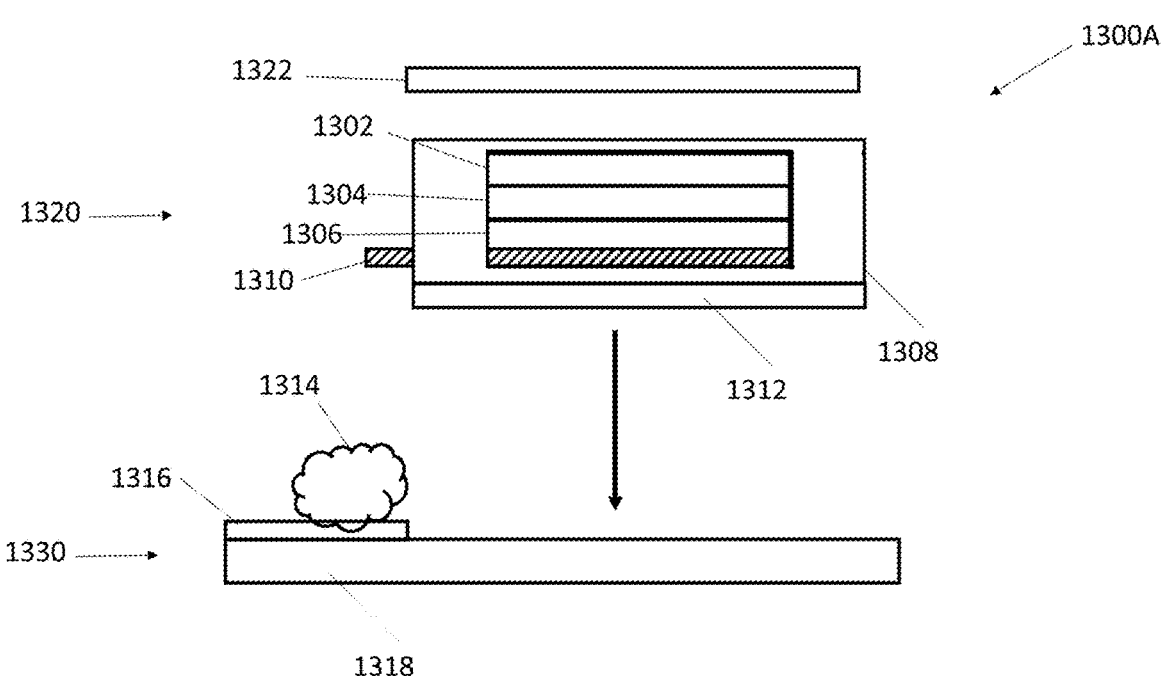
FIG. 13A is a side view illustration of disposing an adhesive attached energy storage device over a device in need thereof including a solder material, according to some embodiment.
Figure 13B:
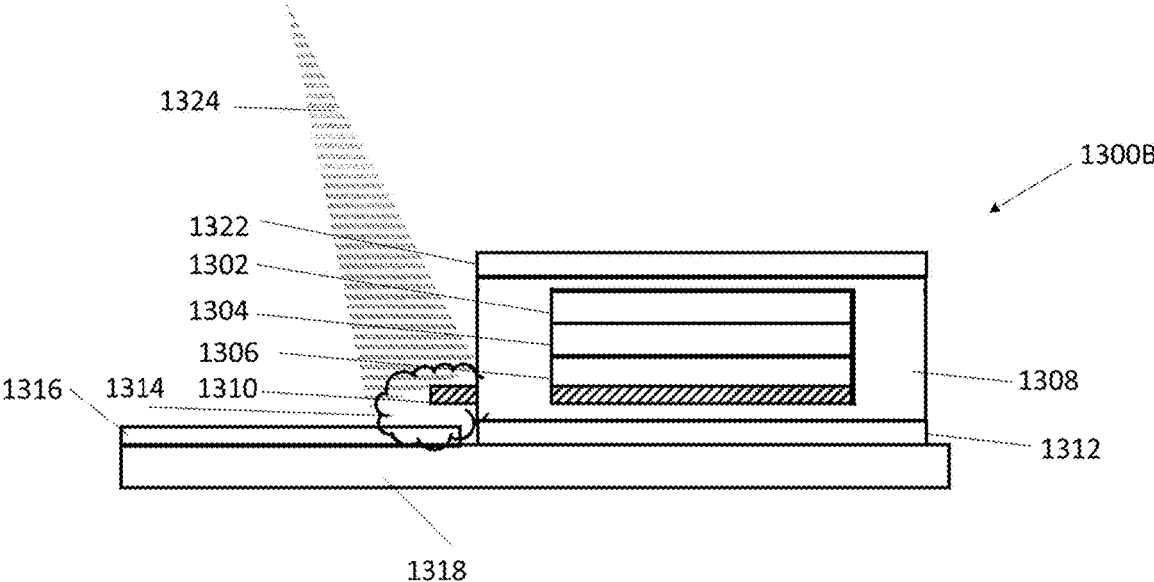
FIG. 13B is a side view illustration photonic sintering an adhesive attached energy storage device to a device in need thereof using a solder material, according to some embodiments.

In FIG. 13A, a process 1300A for attaching an adhesive attached energy storage device 1320 to a device 1330 including a solder material and a light shield 1322 is shown. The adhesive attached energy storage device 1320 includes an anode film 1302, a separator film 1304, a cathode film 1306 and a conductive tab 1310 disposed over one another and encapsulated by a sealing material 1308, wherein the conductive tab 1310 extends through a side wall of the sealing material 1308; and further a mounting adhesive 1312 disposed beneath the bottom side of the sealing material 1308 proximate to the conductive tab 1310. The device 1330 includes a body 1318 (e.g., a PCB) with an electrical connection 1316 (e.g., a copper pad) in electrical communication with the body 1318, and a soldering material 1314 disposed over the electrical connection 1316. The adhesive attached energy storage device 1320 is brought into contact and attached to the device 1330 by bringing mounting adhesive 1312 into contact with body 1318, and bringing soldering material 1314 in contact with the portion of the conductive tab 1310, thereby electrically connecting the energy storage device to the device 1330. The light shield 1322 is disposed over the top side of the sealing material 1308 proximate to the anode film 1302. In order to create a strong electrical connection between the energy storage device to the device 1330, FIG. 13B shows photonic sintering process 1300B for sintering the soldering material 1314 to create a robust electrical connection between the portion of the conductive tab 1310 and the electrical connection 1316 utilizing a high intensity pulsed light 1324.

While certain embodiments have been described, these embodiments have been presented by way of example only, and are not intended to limit the scope of the disclosure. Indeed, the novel methods and systems described herein may be embodied in a variety of other forms. Furthermore, various omissions, substitutions and changes in the systems and methods described herein may be made without departing from the spirit of the disclosure. The accompanying claims and their equivalents are intended to cover such forms or modifications as would fall within the scope and spirit of the disclosure.

Features, materials, characteristics, or groups described in conjunction with a particular aspect, embodiment, or example are to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a subcombination.

Moreover, while operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Further, the operations may be rearranged or reordered in other implementations. Those skilled in the art will appreciate that in some embodiments, the actual steps taken in the processes illustrated and/or disclosed may differ from those shown in the figures. Depending on the embodiment, certain of the steps described above may be removed, others may be added. Furthermore, the features and attributes of the specific embodiments disclosed above may be combined in different ways to form additional embodiments, all of which fall within the scope of the present disclosure. Also, the separation of various system components in the implementations described above should not be understood as requiring such separation in all implementations, and it should be understood that the described components and systems can generally be integrated together in a single product or packaged into multiple products. For example, any of the components for an energy storage system described herein can be provided separately, or integrated together (e.g., packaged together, or attached together) to form an energy storage system.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount, depending on the desired function or desired result.

The scope of the present disclosure is not intended to be limited by the specific disclosures of preferred embodiments in this section or elsewhere in this specification, and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive.

The headings provided herein, if any, are for convenience only and do not necessarily affect the scope or meaning of the devices and methods disclosed herein.

What is claimed is:

1. An energy storage device assembly comprising:
a shaped energy storage device comprising an anode-separator-cathode stack, a sealing material comprising a bottom side and a side wall, and a conductive tab, wherein a portion of the conductive tab extends through the side wall, and wherein the anode-separator-cathode stack is positioned within the sealing material; and
an adhesive layer comprising a mounting adhesive and a conductive adhesive, wherein the mounting adhesive is disposed on the bottom side of the shaped energy storage device, and wherein the conductive adhesive is disposed over the portion of the conductive tab;
wherein the anode-separator-cathode stack comprises an anode, a cathode and a separator positioned between the anode and the cathode, wherein the anode and the cathode each independently comprise an electron beam (EB) cured binder.

2. The energy storage device assembly of claim 1, wherein the shaped energy storage device is a sticker energy storage device.

3. The energy storage device assembly of claim 1, wherein the mounting adhesive is selected from the group consisting of an acrylic based adhesive material, an acrylic based adhesive tape, a polyester based adhesive material, a polyester based adhesive tape, admixtures thereof, and combinations thereof.

4. The energy storage device assembly of claim 1, wherein the conductive adhesive comprises an adhesive material and a conductive material.

5. The energy storage device assembly of claim 4, wherein the adhesive material is selected from the group consisting of acrylic based adhesive material, a polyester based adhesive material, admixtures thereof, and/or combinations thereof.

6. The energy storage device assembly of claim 4, wherein the conductive material is selected from the group consisting of a metal material, a conductive fiber material, and combinations thereof.

7. A device, comprising:
the energy storage device assembly of claim 1; and
a device component comprising a device body and an electrical connection;
wherein the mounting adhesive is disposed on the device body.

8. The device of claim 7, wherein the conductive adhesive is in contact with the portion of the conductive tab and the electrical connection.

9. The device of claim 7, further comprising a soldering material in contact with the portion of the conductive tab and the electrical connection.

10. The device of claim 7, wherein the energy storage device assembly further comprises a light shield disposed over a top side of the shaped energy storage device.

11. The device of claim 10, wherein the light shield comprises a substrate and a light reflectance additive.

12. The energy storage device assembly of claim 1, wherein the EB cured binder is selected from an acrylated polyurethane resin, a hydroxy modified acrylated polyurethane resin, an acrylate-methacrylate monomer blend, a monoacrylate of mono-ethoxylated phenol, trimethylolpropane ethoxy triacrylate, co-polymers thereof, and combinations thereof.

13. The energy storage device assembly of claim 1, wherein the anode-separator-cathode stack further comprises an anode carrier adhesive positioned between the anode-separator-cathode stack and the sealing material.

14. A method of fabricating the energy storage device assembly of claim 1, comprising:
forming the shaped energy storage device; and
disposing the adhesive layer on the bottom side of the shaped energy storage device.

15. The method of claim 14, wherein forming the shaped energy storage device comprises die cutting a plurality of energy storage device elements from a single film comprising a plurality of layers.

16. The method of claim 14, wherein forming the shaped energy storage device comprises die cutting a plurality of energy storage device elements from a plurality of films each comprised of a single layer.

17. The method of claim 14, wherein disposing the adhesive layer comprises calender rolling.

18. A method of attaching an energy storage device to a device in need thereof, comprising:
mounting the energy storage device assembly of claim 1 onto a device component comprising a device body and an electrical connection;
wherein the mounting adhesive is pressed into contact with the device body.

19. The method of claim 18, further comprising a conductive adhesive pressed into contact with the portion of the conductive tab and the electrical connection.

20. The method of claim 18, further comprising a soldering material disposed over the portion of the conductive tab and the electrical connection; and further comprising sintering the soldering material with a pulsed light beam into electrical contact with the portion of the conductive tab and the electrical connection.

21. The method of claim 20, wherein the pulsed light beam comprises an irradiance of about 1-10 kW/cm$^2$, and is pulsed for an exposure time of about 5-500 ms.

\* \* \* \* \*